Figure 1:
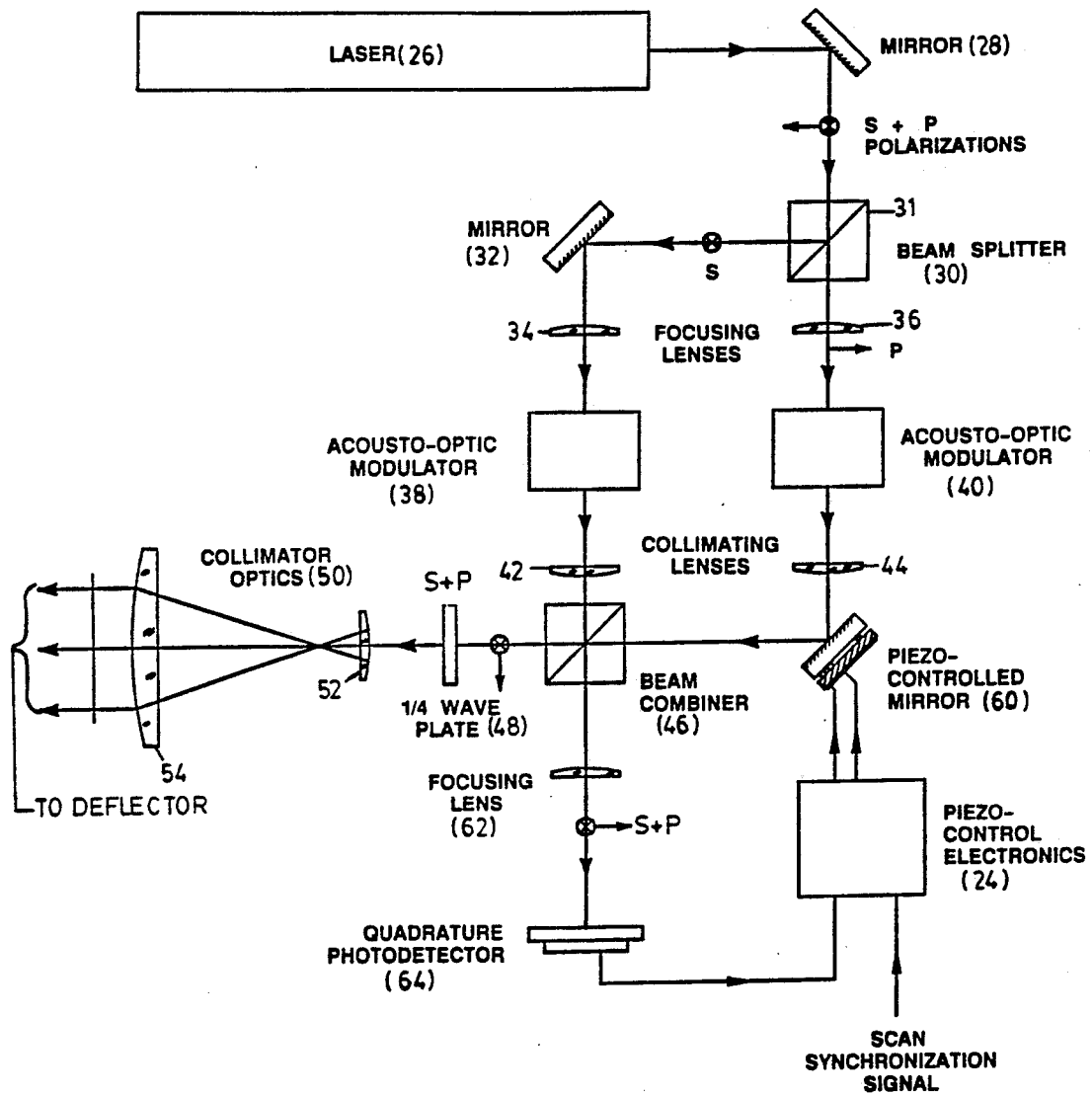

United States Patent [19]

Kramer

[11] Patent Number: 5,097,351
[45] Date of Patent: Mar. 17, 1992

[54] SIMULTANEOUS MULTIBEAM SCANNING SYSTEM

[75] Inventor: Charles J. Kramer, Rochester, N.Y.

[73] Assignee: Holotek, Ltd., Rochester, N.Y.

[21] Appl. No.: 563,363

[22] Filed: Aug. 6, 1990

[51] Int. Cl.$^5$ .................. G02B 26/10; G02B 27/28
[52] U.S. Cl. .................................. 359/17; 359/214; 359/216
[58] Field of Search .............. 350/3.71, 6.5, 6.91; 346/108, 160; 359/483

[56] References Cited

U.S. PATENT DOCUMENTS

| | | | |
|---|---|---|---|
| 4,525,024 | 6/1985 | Tatsuno et al. | 350/6.5 |
| 4,583,816 | 4/1986 | Kramer | 350/3.71 |
| 4,637,679 | 1/1987 | Funato | 350/3.71 |
| 4,779,944 | 10/1988 | Ritter et al. | 350/3.71 |
| 4,786,126 | 11/1988 | Kramer . | |
| 4,796,961 | 1/1989 | Yamada et al. | 350/6.5 |
| 4,826,268 | 5/1989 | Kramer | 350/3.71 |
| 4,852,956 | 8/1989 | Kramer . | |
| 4,853,709 | 8/1989 | Stein et al. | 350/6.5 |
| 4,925,261 | 5/1990 | Byckling et al. | 350/3.71 |
| 5,009,472 | 4/1991 | Morimoto | 350/6.5 |

OTHER PUBLICATIONS

Arimoto et al., "Dual Beam Laser Diode Scanning System for Ultrahigh Speed Laser Beam Printers Using a Spot Control Method", *Applied Optics*, vol. 26, No. 13, 1 Jul. 1987, pp. 2554 to 2557.

C. J. Kramer, "Hologon Deflectors for High-Resolution Internal Drum and Flat-Field Imaging", SPIE Proceedings, vol. 1079, p. 427 et sq., Jan. 1989.

*Primary Examiner*—Bruce Y. Arnold
*Assistant Examiner*—Martin Lerner
*Attorney, Agent, or Firm*—Martin Lukacher

[57] ABSTRACT

A dual, simultaneous beam scanning system for simultaneously scanning two individually modulated adjacent scan lines on an internal drum imaging surface uses a deflector which varies the angular orientation between combined orthogonally polarized beams so that one of the beams rotates about the other in synchronism with the angular position (the distance between start of scan) along the scan lines around the drum imaging surface. Signals from both a beam position sensing photodetector array and from a shaft encoder on the deflector unit, such as a Hologono deflector, controls the deflector of one of the orthogonally polarized beams so as to maintain the spacing and prevent crossovers of the adjacent scan lines and also reduce differential bow. Differential bow may be corrected both in the internal drum configuration and in a flat field imaging system using plural beam scanning. The scan lines can overlap so as to provide high resolution imaging at a rate of the order of hundreds of scan lines per second.

12 Claims, 2 Drawing Sheets

SIMULTANEOUS MULTIBEAM SCANNING SYSTEM

The present invention relates to Hologon scanning systems and particularly to multibeam Hologon (Holographic Diffraction Grating) scanning systems.

The invention is especially suitable for use in providing simultaneous dual beam scanning in a Hologon deflector system on an internal drum imaging surface whereby to enable high resolution, high speed scanning with an addressability of the order of thousands of dots or pixels per inch at scanning rates of the order of hundreds of lines per second.

U.S. Pat. No. 4,786,126 issued Nov. 22, 1988 describes a simultaneous dual beam scanning system wherein combined orthogonally polarized (COP) beams are scanned across an image surface. U.S. Pat. No. 4,852,956 issued Aug. 1, 1989 shows a Hologon monograting deflector system for scanning a beam on an internal drum surface. The use of simultaneous dual beam scanning with orthogonally polarized beams in an internal drum scanning geometry produces scanning lines which cross over; tracing effectively lisajous patterns instead of colinear scan lines as is desired.

It is the principal object of the present invention to provide an improved multibeam scanning system for simultaneously scanning a plurality of scan lines on an internal drum imaging surface with a Hologon deflector which rotates internally of the drum.

It is a further object of the present invention to provide an improved multibeam scanning system wherein the cross-scan position of each beam is varied as a function of scan field position (the position from the start of scan along the scan lines) so as to maintain the desired spacing including an overlapping relationship) of the simultaneously scanned lines, and also to reduce differential scan line bow between successive pairs of scan lines.

Briefly described, a scanning system embodying the invention utilizes a deflector, such as a Hologon, which rotates around an internal drum imaging surface. A laser source, preferably from a single laser, provides differently polarized (such as orthogonally polarized) beams which are combined into copropagating beams; the beams having circular polarizations in opposite senses (rotating in opposite hands) which provide adjacent scan lines simultaneously when deflected by a Hologon deflector which rotates around the imaging surface. Means are provided for deflecting one of the polarized beams before it is combined with the other of the beams to provide the copropagating beams. Means are provided for synchronizing the deflection of the deflected beam with the rotation of the deflector for causing that beam to rotate about the second beam at a rate which maintains the line separation and prevents crossovers thereof. The invention also reduces differential scan line bow. In the case of flat field imaging, bow occurs where the beam is tilted with respect to the axis of a post deflection lens, such as an F-$\theta$ lens. See U.S. Pat. No. 4,583,816 issued to C. J. Kramer on Apr. 22, 1986. Residual differential scan line bow is the cross-scan error between adjacent scan lines, successive pairs of which are closer and farther apart at the ends of the lines. In a system in which a plurality of beams are deflected to scan a plurality of lines at the same time, residual differential bow can be compensated by deviating the beam which is not directed along the axis of the focusing lens as a function of scan angle of the deflector.

Figure 2:
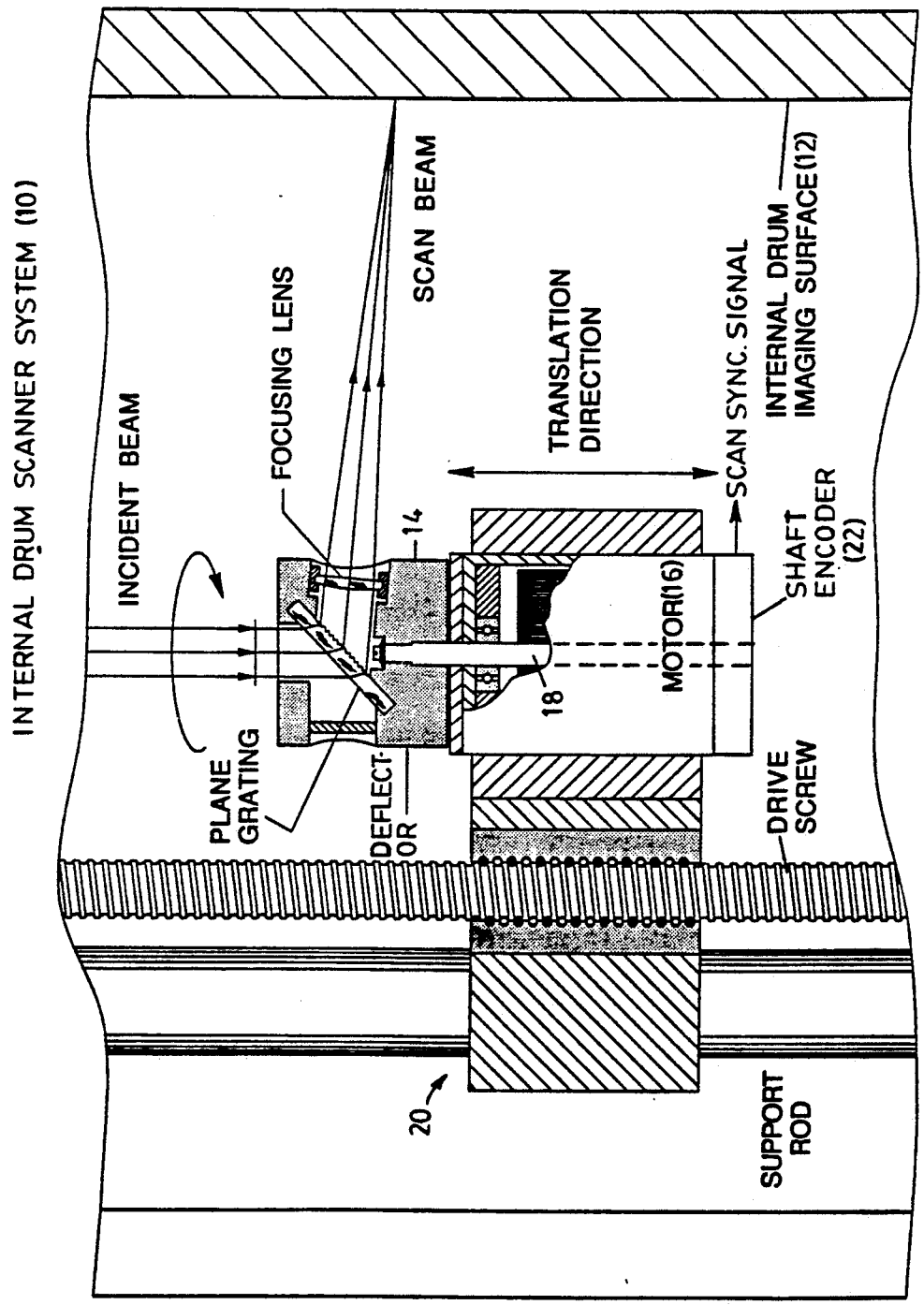

The foregoing and other objects, features and advantages of the invention will become more apparent from a reading of the following description in connection with the accompanying drawings in which:

FIG. 1 is a schematic diagram of an optical system which produces dual, orthogonally polarized collimated beams; and FIG. 2 is a schematic diagram of an internal drum Hologon scanner system utilizing the dual orthogonally polarized collimated beams generated in the portion of the system illustrated in FIG. 1.

Referring first to FIG. 2, there is shown an internal drum scanner system 10 wherein an imaging surface is provided by photosensitive material affixed as by static pressure and/or a vacuum clamp (not shown) on the inside of the drum at the internal drum imaging surface 12. A Hologon deflector system having a monograting deflector 14 driven by a motor 16 and connected to the motor in an assembly, which moves along the axis of the imaging surface which is the axis along which the shaft 18 of the motor extends, is translated by a drive screw and support rod mechanism 20. The Hologon deflector system 14 is of the type described in the above-referenced U.S. Pat. No. 4,852,956. The scan rate of the system can be increased by using a sequential dual beam system using two pairs of beams which generates two scans for each cycle of rotation of the deflector. See C. J. Kramer, "Hologon Deflectors For High-Resolution Internal Drum and Flat-Field Imaging," SPIE Proceedings on Hard Copy Output, Vol. 1079, page 427 et seq., January, 1989. A disk-type Hologon deflector having radial symmetry with regard to the deflector rotation axis, see, e.g., I. Cindrich, Image Scanning by Rotation of Hologram, Appl Opt., 6, 1531 (1967), can also be used in an internal drum imaging system.

The incident beams to the plane grating of the deflector 14 are generated in the simultaneous dual beam system illustrated in FIG. 1. This system enables the proper cross-scan and in-scan angular relationship between the dual scanning beams to be achieved by changing the angular orientation of one of the incident beams to the deflector unit 14 so that it is correctly synchronized to the rotation rate of the deflector. The synchronizing signals are obtained from a deflector shaft encoder 22 which provides a scan synchronization signal to control electronics 24 of the system illustrated in FIG. 1.

Although two laser beams can be generated from separate lasers (when more laser power is required), a single laser source 26 need only be used. Returning to FIG. 1, the laser is linearly polarized with its plane of polarization angularly oriented at 45° to the plane containing the optical components. For this angular orientation, the laser output power is equally divided into S and P polarized beam components. It will be appreciated that the S and P polarizations correspond to the E1 and E2 polarizations shown in U.S. Pat. No. 4,786,126 referenced above. The S and P polarized beam components are separated by means of a polarization sensitive beam splitter 30 which may be a multilayer dielectric coated mirror or a grating element preferably having a wavelength to grating period equal to 1.4142. The S beam is folded by a mirror 32 and focused by a lens 34. The P beam is focused by a lens 36. Thus there are two orthogonally polarized laser beams which are incident upon acousto-optic modulators 38 and 40 which independently modulate the beams. The modulated beams are collimated in collimating lenses 42 and 44 and combined in a polarization sensitive beam combiner 46. Beam combiner 46 is essentially identical to beam splitter 30, but used in reverse. The use of orthogonal polarizations and the polarization sensitive beam splitter 30 and beam combiner 46 contribute to high radiometric efficiency for the combined beam. The combined beam is transmitted to a quarter wave plate 48 and collimator optics 50 made up of a beam expanding lens 52 and a collimating lens 54. The axis of the collimator optics 50 is the axis along which the S polarized beam is projected, as one of the incident beams on the plane grating of the deflector 14 (FIG. 2).

The combined orthogonally polarized (COP) beams do not coherently interfere with each other. Thus, undesirable intensity fluctuations do not occur in the image plane (the internal drum imaging surface 12) when the beams are overlapped. One of the beams, the P beam, is controlled in angular orientation with respect to the S beam and also to the axis of the optics 50 by deflector means provided by a piezo-electric, mini-deflector mirror 60. The control electronics 24 provides signals which control the deflection, both in the cross-scan and in-scan direction of the P beam with respect to the S beam and the axis of the optics 50.

A small portion of the P beam is reflected and a small portion of the S beam is transmitted through the beam combiner 46 and is focused by a lens 62 on a quadrature photodetector array 64. This is a four zone photodetector element which is used as a two axis beam position sensing photodetector. The photodetector 64 measures the relative distance between the two COP beams and therefore provides an output signal corresponding to the relative angular orientation difference between these beams. This signal is fed back to the control electronics 24 for adjusting the mirror 60 used in deflecting the P beam. The control signals enable the angular alignment between the COP beams to be maintained to better than 0.5 arc seconds. In addition the detector 64 can be used during non-writing periods of the scan to measure the intensity of the individual COP beams for calibration purposes or for controlling the laser source 26 to control the intensity of the beams.

The quarter wave plate 48 imposes a phase shift of 90° at the wavelength of the laser beams. Accordingly, the combined beam which is incident on the deflector 14 (FIG. 2) are dual beams with circular polarization of opposite states (in opposite senses or rotating in opposite hands). The feedback signals from the photodetector 64 and the deflector shaft encoder 22 (FIG. 2) are used so that the rotation rate of one of these beams (originally the P beam) about the other beams (originally the S beam) is synchronized with the angular position of the deflector 14. The quadrature photodetector 64 may be unnecessary and the scan synchronization signal used alone to start the generation of a control signal, for example by reading out a read only memory, in which a predetermined control signal is stored, in the control electronics 24 at a rate corresponding to the rotation rate of the deflector 14. Then the cross-scan and in-scan angular relationship between the beams is synchronized to the rotation rate of the deflector (i.e., to the scan angle). Without such synchronous control the dual beams will crossover at least twice each cycle of rotation of the deflector and differential bow would result. It is desirable to have overlapping beams or beams which are adjacent to each other and maintain their spacing throughout the scan so as to create scan lines of constant spacing and preferably colinear, straight scan lines on the internal drum imaging surface 12. The synchronous deflection control enables the two individually modulated overlapping or adjacent scan lines to be generated.

The piezo-electric adjusting element 60 may be replaced by drive motors or electromagnetic systems such as used in optical disk tracking systems.

In the dual beam case, for flat field imaging, in order to correct differential bow, one of the beams is directed along the axis of the F-$\theta$ scan lens, while the other beam has a tilt (say $\pm\theta_T$) upwardly to that axis. The separation of the beams is changed in the cross scan (perpendicularly to the scan line) direction as a function of scan angle, as by the mirror 60 to FIG. 1, to compensate for the scan-line bow introduced by the beam propagating at a tilt angle with regard to the optical axis of the F-$\theta$ scan lens. The scan line generated by the tilted beam is straightened and differential bow between adjacent pairs of lines is reduced or eliminated. The optical system of FIG. 1 can be used with a mirror based (e.g., rotating polygon) or pentaprism (see, e.g., U.S. Pat. No. 4,457,787 August 1984) or other deflector to produce dual beam scanning in a flat field or in an internal drum imaging system. When the optical system of FIG. 1 is used with a mirror based (reflection based) deflector device, the $\lambda/4$ waveplate can be eliminated since reflection deflectors do not need circularly polarized light to produce a uniform intensity scan inside a drum imaging surface.

The foregoing and other modifications and variations of the hereindescribed system within the scope of the invention will undoubtedly suggest themselves to those skilled in the art. Accordingly, the foregoing description should be taken as illustrative and not in a limiting sense.

I claim:

1. An internal drum scanning system for scanning an image surface disposed internally of a drum which comprises a deflector within said drum which rotates within said internal drum's imaging surface, means for providing polarized beams having different polarizations which are combined into co-propagating beams incident on said deflector to provide adjacent scan lines simultaneously as said deflector rotates within said imaging surface, means for deflecting one of said beams before it is combined with the other of said beams to provide said co-propagating beams, and means for synchronizing the deflection of said one beams with the rotation of said deflector for causing said one beam to rotate about said second beam, as the center of rotation of said first beam, to make the lines scanned by said beams across said imaging surface parallel to each other.

2. The system according to claim 1 wherein said synchronizing means includes control means for varying the amount of deflection of said one beam so as to maintain said scan lines separated from each other and prevent cross-over thereof.

3. The system according to claim 2 further comprising collimating optics having an axis for projecting said copropagating beams to be incident on said deflector, beam combiner means between said deflecting means and collimating optics for directing said other beam along said axis and said one beam angularly oriented to said axis in accordance with the deflection thereof.

4. The system according to claim 3 further comprising means for sensing the relative position of each of said beams with respect to the other, and said control means including means responsive to said sensing means for controlling said deflecting means.

5. The system according to claim 4 wherein said deflecting means is a electromechanically controlled reflector responsive to control signals, said control means being responsive to said sensing means for providing said control signals.

6. The system according to claim 5 further comprising means responsive to the rotation position of said deflector for providing synchronization signals, said control means also being responsive to said synchronization signals.

7. The system according to claim 4 wherein said beam combiner means comprises means for transmitting and reflecting said polarized beams along first and second paths, one of said paths being along said axis and the other of said paths being incident upon said sensing means.

8. The system according to claim 7 wherein said sensing means is a quadrature photodetection array.

9. The system according to claim 1 further comprising means for individually modulating said one beam and said second beam before said one beam is deflected by said deflecting means and before said polarized beams are combined into said copropagating beams.

10. The system according to claim 1 wherein said polarized beams providing means provides said beams with orthogonal polarizations.

11. The system according to claim 1 wherein said polarized beam providing means provides said beams with circular polarizations having opposite senses.

12. The system according to claim 1 wherein said deflector is a Hologon deflector and said polarized beam providing means includes means for providing said beam with circular polarizations in opposite senses.

* * * * *